(12) United States Patent
Notoya et al.

(10) Patent No.: US 9,929,646 B2
(45) Date of Patent: Mar. 27, 2018

(54) CHARGE PUMP CIRCUIT AND STEP-DOWN REGULATOR CIRCUIT

(71) Applicant: KABUSHIKI KAISHA TOSHIBA, Tokyo (JP)

(72) Inventors: Koichi Notoya, Kawasaki Kanagawa (JP); Naoki Takahashi, Kawasaki Kanagawa (JP); Kyosuke Ogawa, Kawasaki Kanagawa (JP); Yasunori Tanaka, Yokosuka Kanagawa (JP); Masahiro Ishibashi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/253,880

(22) Filed: Sep. 1, 2016

(65) Prior Publication Data
US 2017/0179819 A1    Jun. 22, 2017

(30) Foreign Application Priority Data
Dec. 21, 2015  (JP) .................................. 2015-248719

(51) Int. Cl.
  *H02M 3/07*  (2006.01)
(52) U.S. Cl.
  CPC ........ *H02M 3/07* (2013.01); *H02M 2003/072* (2013.01)
(58) Field of Classification Search
  CPC .............................................. H02M 2003/072
  See application file for complete search history.

(56) References Cited

U.S. PATENT DOCUMENTS

| 5,596,489 | A | * | 1/1997 | Bazes | ..................... H02M 3/07 307/109 |
| 6,304,068 | B1 | * | 10/2001 | Hui | ........................ H02M 3/07 323/225 |
| 6,512,411 | B2 | * | 1/2003 | Meng | ..................... H02M 3/07 307/110 |
| 6,853,533 | B2 | | 2/2005 | Parkhe | |

(Continued)

FOREIGN PATENT DOCUMENTS

| JP | 2005-094965 A | 4/2005 |
| JP | 2009-055722 A | 3/2009 |

(Continued)

*Primary Examiner* — Thomas J Hiltunen
(74) *Attorney, Agent, or Firm* — Patterson & Sheridan, LLP

(57) ABSTRACT

A charge pump circuit includes a capacitor, a first switch between the capacitor and a power supply terminal, a second switch between the capacitor and an output terminal, a third switch between the output terminal and the capacitor, a fourth switch between the capacitor and a ground terminal, and a control unit configured to generate control signals for the switches. The control signals include first signals generated during a first period that cause first and third switches to be in an ON state and second and fourth switches to be in an OFF state, second signals generated during a second period that cause first and third switches to be in an OFF state and second and fourth switches to be in an ON state, and third signals generated between the first and second periods, that cause the ON/OFF state of each of the switches to be switched at different times.

17 Claims, 15 Drawing Sheets

(56) References Cited

U.S. PATENT DOCUMENTS

| | | | | |
|---|---|---|---|---|
| 6,995,995 B2* | 2/2006 | Zeng | .................. | H02M 3/07 327/536 |
| 7,099,167 B2* | 8/2006 | Fujise | .................... | H02M 3/07 363/62 |
| 7,342,389 B1* | 3/2008 | Wu | .................... | H02M 3/07 323/288 |
| 7,990,742 B2* | 8/2011 | Lesso | .................... | H02M 3/07 363/60 |
| 8,264,273 B2* | 9/2012 | MacFarlane | ............ | H02M 3/07 327/536 |
| 8,981,838 B1* | 3/2015 | Chuang | .................. | H02M 3/07 327/536 |
| 9,160,166 B2* | 10/2015 | Fernald | .................... | H02J 1/00 |
| 2009/0309566 A1* | 12/2009 | Shiu | .................... | H02M 3/07 323/283 |
| 2011/0101938 A1* | 5/2011 | Ma | .................... | H02M 3/07 323/282 |
| 2016/0062378 A1* | 3/2016 | Ruiz | .................... | H02M 3/07 323/268 |

FOREIGN PATENT DOCUMENTS

| JP | 2010057230 A | 3/2010 |
|---|---|---|
| JP | 2011-030327 A | 2/2011 |

* cited by examiner

CHARGE PUMP CIRCUIT AND STEP-DOWN REGULATOR CIRCUIT

CROSS-REFERENCE TO RELATED APPLICATION

This application is based upon and claims the benefit of priority from Japanese Patent Application No. 2015-248719, filed Dec. 21, 2015, the entire contents of which are incorporated herein by reference.

FIELD

Embodiments described herein relate generally to a charge pump circuit and a step-down regulator circuit.

BACKGROUND

In order to operate a semiconductor integrated circuit at a low voltage, a step-down regulator circuit is mounted on the semiconductor integrated circuit and the semiconductor integrated circuit is operated at a voltage lower than a power supply voltage. A low dropout (LDO) series regulator is used as a step-down regulator circuit.

However, when the difference between a power supply voltage and an output voltage of an LDO series regulator is large, the voltage difference causes heating losses. Accordingly, a charge pump circuit that reduces a power supply voltage to ½ is connected to the LDO series regulator, an output voltage of the charge pump circuit becoming the input voltage to the LDO series regulator. In this way, a difference between the input voltage and an output voltage of the LDO series regulator decreases, and losses from the LDO series regulator decrease.

The charge pump circuit includes a first switch connected between a power terminal and one end of a capacitor, a second switch connected between one end of the capacitor and an output terminal, a third switch between the output terminal and the other end of the capacitor, and a fourth switch connected between the other end of the capacitor and a ground terminal.

In the charge pump circuit, switching is repeatedly performed between a first state in which the first and third switches are turned on and the second and fourth switches are turned off and a second state in which the first and third switches are turned off and the second and fourth switches are turned on.

At the time of the switching, the output terminal and the ground terminal are short-circuited when the third and fourth switches are simultaneously turned on. Accordingly, in order to prevent the short-circuit, a non-overlap switching method is generally performed in the switching of the switches.

In the non-overlap switching method, however, a state in which all of the switches are turned off occurs, during which supply of a current to the output terminal is interrupted, and thus there is a problem that an output potential of the charge pump circuit is abruptly dropped. As a result, a relatively large variation in the output voltage, a so-called ripple, occurs in the LDO series regulator.

DETAILED DESCRIPTION

Figure 1:
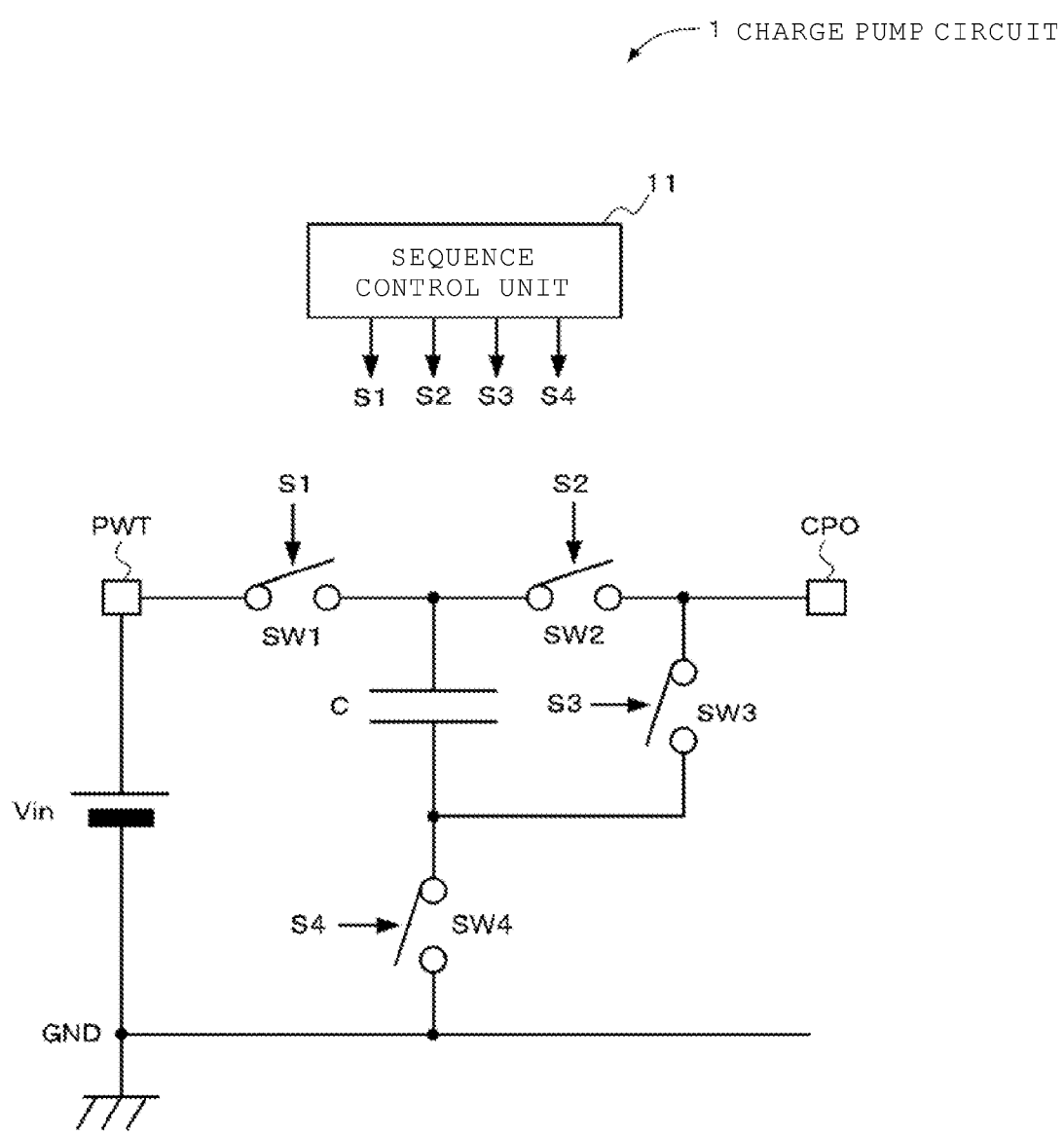
FIG. 1 is a circuit diagram illustrating an example of the configuration of a charge pump circuit according to a first embodiment.

Embodiments provide a charge pump circuit capable of suppressing an abrupt drop of an output potential and a step-down regulator circuit capable of reducing ripple in the output.

In general, according to one embodiment, a charge pump circuit includes a capacitor, a first switch that is connected between a first terminal of the capacitor and a power supply terminal, a second switch that is connected between the first terminal of the capacitor and an output terminal, a third switch that is connected between the output terminal and a second terminal of the capacitor, a fourth switch that is connected between the second terminal of the capacitor and a ground terminal, and a control unit configured to generate signals for controlling an ON/OFF state of each of the first, second, third, and fourth switches. The signals include first control signals generated during a first period that cause the first and third switches to be in an ON state and the second and fourth switches to be in an OFF state, second control signals generated during a second period following the first period that cause the first and third switches to be in an OFF state and the second and fourth switches to be in an ON state, and third control signals generated during a transition period between the first and second periods, that cause the ON/OFF state of each of the first, second, third, and fourth switches to be switched at different times.

Hereinafter, embodiments are described with reference to the drawings. The same reference numerals are given to identical or equivalent portions in the drawings, and the description thereof is not repeated.

First Embodiment

FIG. 1 is a circuit diagram illustrating an example of the configuration of a charge pump circuit according to a first embodiment.

A charge pump circuit 1 according to this embodiment includes a capacitor C, a switch SW1 connected between one end of the capacitor C and a power supply terminal PWT, a switch SW2 connected between the one end of the capacitor C and an output terminal CPO, a switch SW3 connected between the output terminal CPO and the other end of the capacitor C, a switch SW4 connected between the other end of the capacitor C and a ground terminal GND, and a sequence control unit 11 that controls a sequence of switching of the switches SW1 to SW4 and controls storing of charges in the capacitor C and supply of a current to the output terminal CPO.

The sequence control unit 11 individually controls ON/OFF switching of the switches SW1 to SW4 in accordance with switch control signals S1 to S4 so that a current is normally supplied to the output terminal CPO.

In a basic operation of the charge pump circuit 1, one pair of switches SW1 and SW3 and one pair of switches SW2 and SW4 are set, ON and OFF of the switches are repeated so that the other pair of switches are turned off when one pair of switches are turned on, and a ½ voltage of a voltage Vin input to the power supply terminal PWT is output to the output terminal CPO.

The basic operation of the charge pump circuit 1 is described with reference to FIG. 2. Here, a parasitic capacitor Cp formed by a circuit connected to the output terminal CPO is assumed to be connected to the output terminal CPO in the description.

Figure 2A:
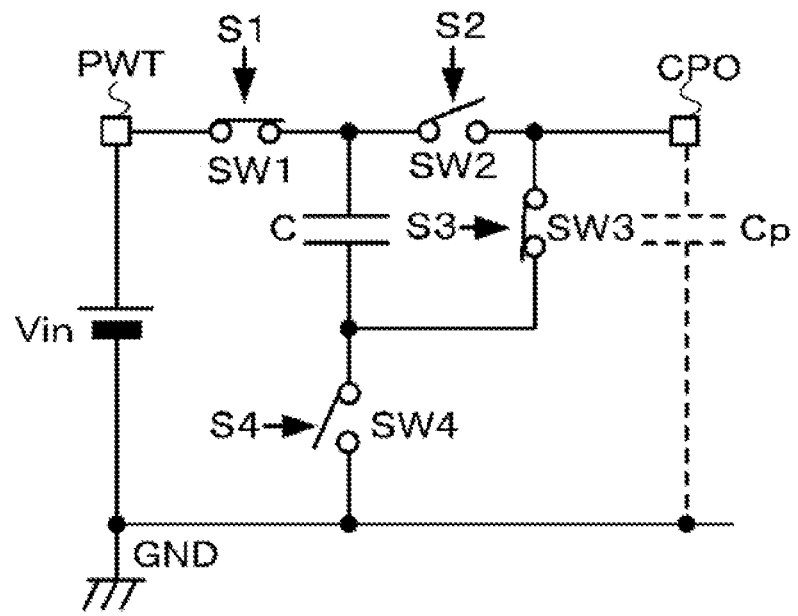
FIGS. 2A to 2D are diagrams illustrating a basic operation of the charge pump circuit according to the first embodiment.
Figure 2B:
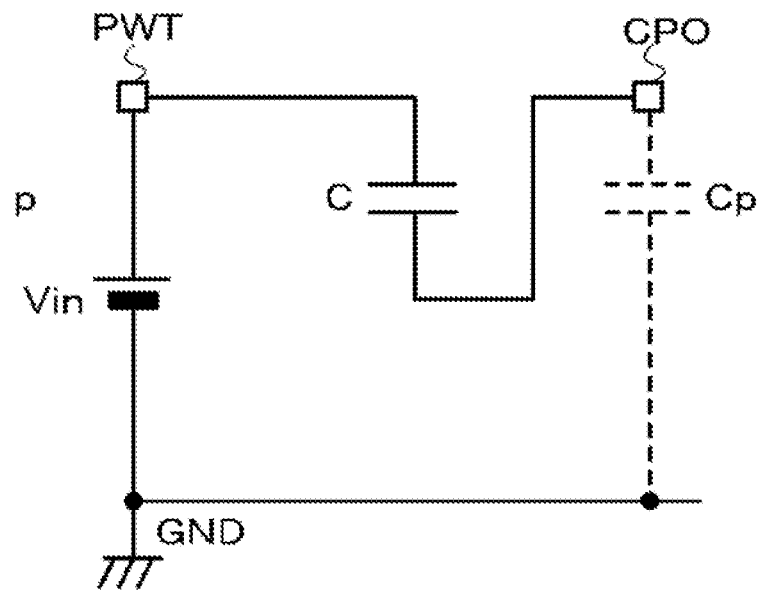

First, as illustrated in FIG. 2A, the switches SW1 and SW3 are turned on and the switches SW2 and SW4 are turned off. When this state is illustrated in an equivalent circuit diagram, FIG. 2B, the capacitor C and the parasitic capacitor Cp are connected to each other in series between the power supply terminal PWT and the ground terminal GND. At this time, an initial value of the output terminal CPO is a value close to 0 V. Accordingly, a current flows from the power supply terminal PWT to the capacitor C and the parasitic capacitor Cp, and thus charges are stored in the capacitor C and the parasitic capacitor Cp.

Figure 2C:
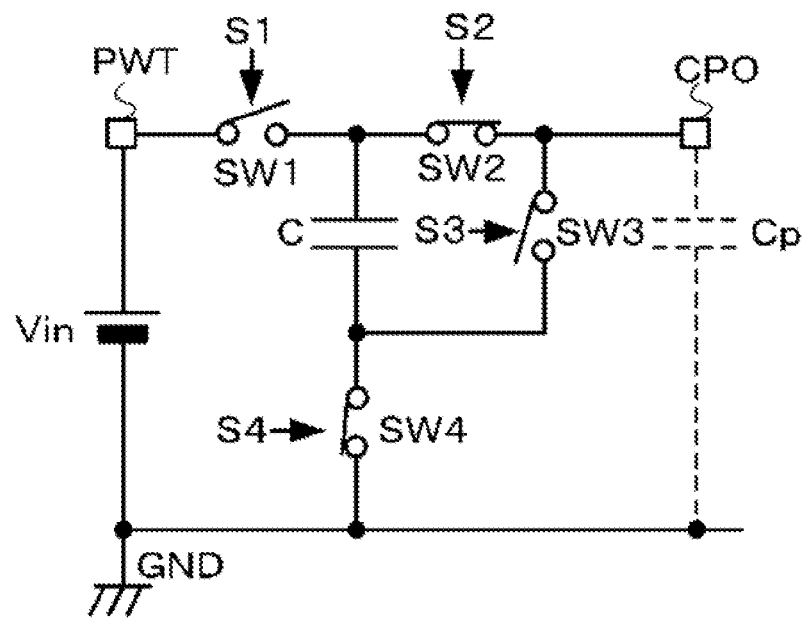
Figure 2D:
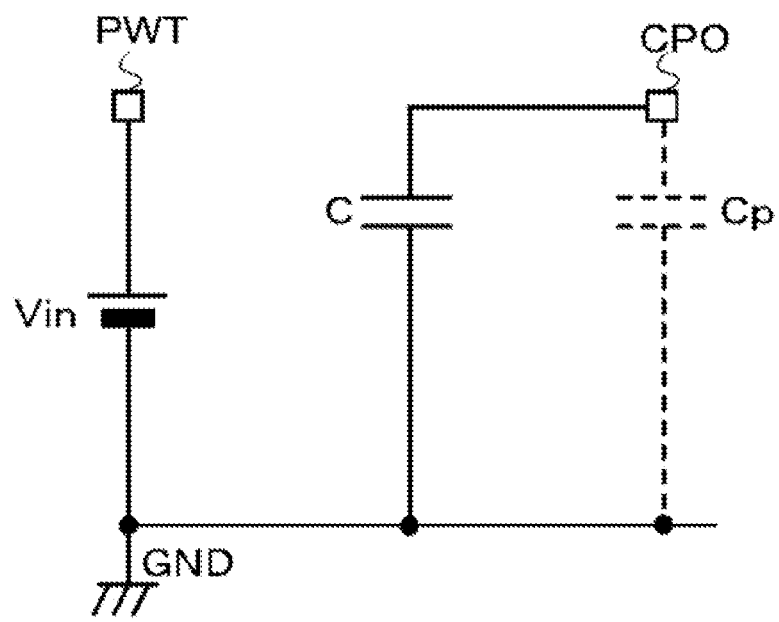

Thereafter, as illustrated in FIG. 2C, the switches SW1 and SW3 are turned off and the switches SW2 and SW4 are turned on. When this state is illustrated in an equivalent circuit diagram, FIG. 2D, the capacitor C and the parasitic capacitor Cp are connected in parallel. Therefore, charge moves between the capacitor C and the parasitic capacitor Cp so that terminal voltages of the capacitor C and the parasitic capacitor Cp are averaged (that is, a voltage of the output terminal CPO), and thus the voltage of the output terminal CPO is increased from the initial value.

Thereafter, when the switches are switched to the state illustrated in FIG. 2A, the capacitor C and the parasitic capacitor Cp are connected in series again. At this time, when the voltage of the output terminal CPO is still lower than ½ Vin despite the increase from the initial value, a current flows from the power supply terminal PWT to the capacitor C and the parasitic capacitor Cp again. Therefore, the charges stored in the capacitor C and the parasitic capacitor Cp increase.

Therefore, when the switches are switched to the state illustrated in FIG. 2C, the capacitor C and the parasitic capacitor Cp are again connected in parallel and the terminal voltages of the capacitor C and the parasitic capacitor Cp are averaged. At this time, since the charges stored in the capacitor C and the parasitic capacitor Cp increase to be greater than at the previous time, the terminal voltage, that is, the voltage of the output terminal CPO, increases to be greater than at the previous time.

In this way, as the ON/OFF states of the switches SW1 to SW4 are repeatedly switched between the state illustrated in FIG. 2A and the state illustrated in FIG. 2C, the voltage of the output terminal CPO gradually increases and finally reaches ½ Vin.

When the voltage of the output terminal CPO reaches ½ Vin and the capacitor C and the parasitic capacitor Cp enter the serial connection state, as illustrated in FIG. 2A, the voltages of both of the terminals become identical to ½ Vin together. Therefore, even when the switches enter the state illustrated in FIG. 2A, no current flows from the power supply terminal PWT to the capacitor C and the parasitic capacitor Cp.

Therefore, even when the switches are switched to the state illustrated in FIG. 2C, the voltage of the output terminal CPO is held at ½ Vin and an equilibrium state is achieved.

In this way, in the charge pump circuit 1 according to the embodiment, the ½ voltage of the voltage input to the power supply terminal PWT is output to the output terminal CPO through the basic operation.

However, at the time of switching of the state illustrated in FIG. 2A and the state illustrated in FIG. 2C, the voltage of the output terminal CPO is unstable. For example, when the switches SW3 and SW4 are simultaneously turned on, the output terminal CPO and the ground terminal GND are short-circuited and the voltage of the output terminal CPO is drastically dropped. When all of the switches SW1 to SW4 are turned off, no current is supplied to the output terminal CPO and the voltage of the output terminal CPO is also dropped.

In this embodiment, accordingly, the sequence control unit 11 controls a sequence of the switching of the switches SW1 to SW4 so that the output terminal CPO and the ground terminal GND are not short-circuited momentarily and a current is continuously supplied to the output terminal CPO at the time of switching of the state illustrated in FIG. 2A and the state illustrated in FIG. 2C.

Figure 3:
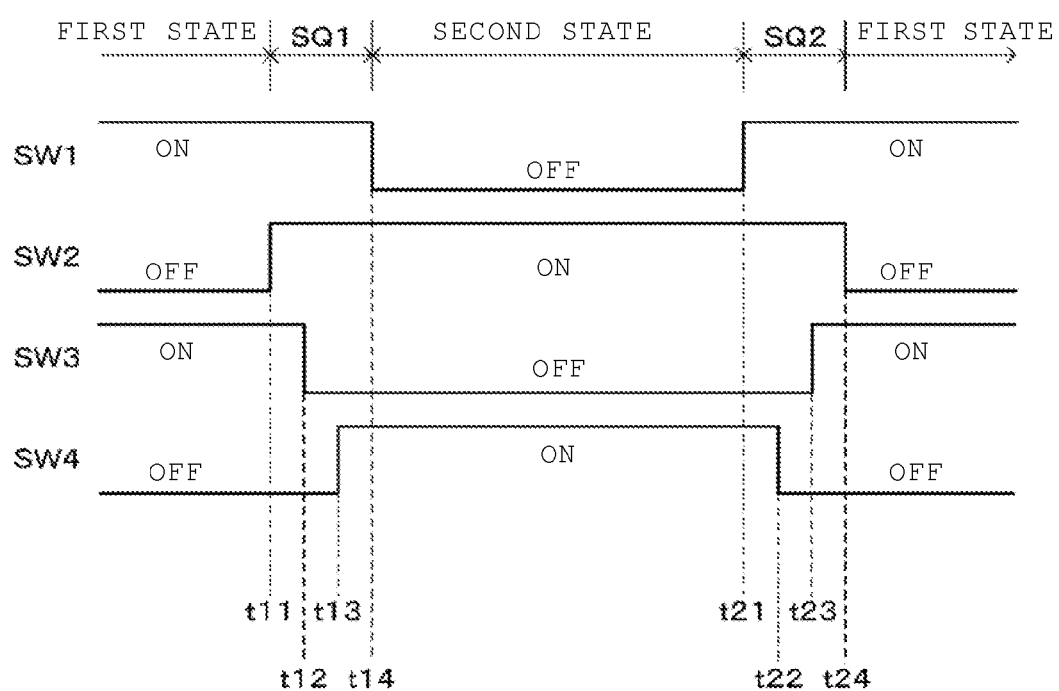
FIG. 3 is a timing chart illustrating an example of a switching sequence of the charge pump circuit according to the first embodiment.

A switching sequence control of the sequence control unit 11 is described with reference to FIGS. 3 to 5. FIG. 3 is a timing chart illustrating an example of the switching sequence. FIGS. 4 and 5 are diagrams illustrating a current path and a change in open and close states of the switches SW1 to SW4.

In FIG. 3, the state in which the switches SW1 and SW3 are turned on and the switches SW2 and SW4 are turned off, as illustrated in FIG. 2A, is labeled the first state, the state in which the switches SW1 and SW3 are turned off and the switches SW2 and SW4 are turned on, as illustrated in FIG. 2C, is labeled the second state, a switching sequence at the time of transition from the first state to the second state is labeled a first sequence SQ1, and a switching sequence at the time of transition from the second state to the first state is labeled a second sequence SQ2.

First, a switching order of the switches SW1 to SW4 in the sequence SQ1 is described with reference to FIG. 4.

Figure 4A:
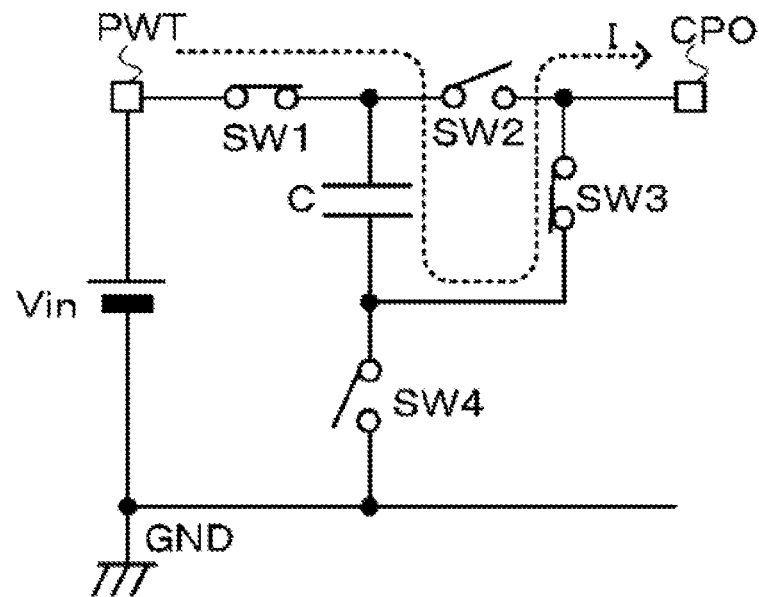
FIGS. 4A to 4E are diagrams illustrating a current path and a change in open and close states of switches in a sequence SQ1 illustrated in FIG. 3.

In the first state, as illustrated in FIG. 4A, the switches SW1 and SW3 are turned on and the switches SW2 and SW4 are turned off. At this time, a current I flows from the power supply terminal PWT to the output terminal CPO via the switch SW1, the capacitor C, and the switch SW3.

Figure 4B:
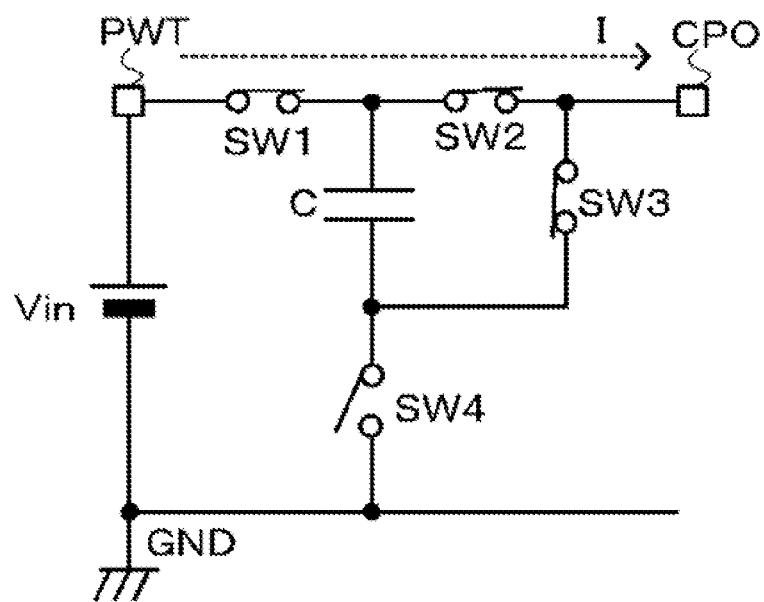

In the first sequence SQ1 from the first state to the second state, the switch SW2 is first turned on at time t11. Accordingly, as illustrated in FIG. 4B, the switch SW2 is turned on in addition to the switches SW1 and SW3, and the switch SW4 is turned off. At this time, the current I flows from the power supply terminal PWT to the output terminal CPO via the switches SW1 and SW2.

Figure 4C:
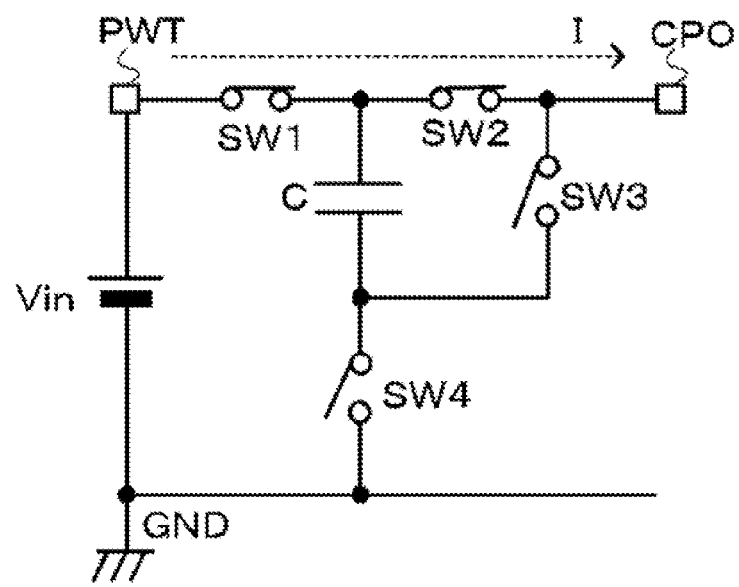

Next, at time t12, the switch SW3 is turned off. Accordingly, as illustrated in FIG. 4C, the switches SW1 and SW2 are turned on and the switches SW3 and SW4 are turned off. Even at this time, the current I flows from the power supply terminal PWT to the output terminal CPO via the switches SW1 and SW2.

Figure 4D:
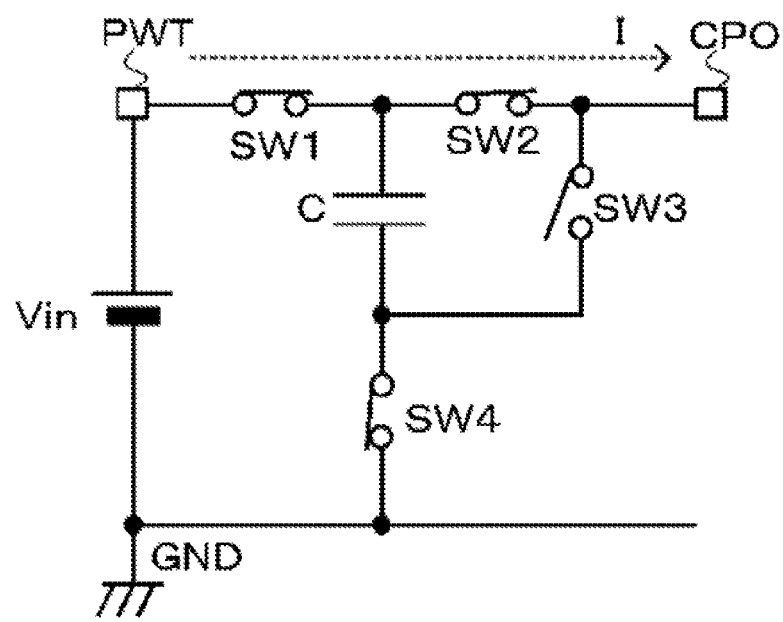

Next, at time t13, the switch SW4 is turned on. Accordingly, as illustrated in FIG. 4D, the switch SW4 is turned on in addition to the switches SW1 and SW2, and the switch SW3 is turned off. Even at this time, the current I flows from the power supply terminal PWT to the output terminal CPO via the switches SW1 and SW2.

Figure 4E:
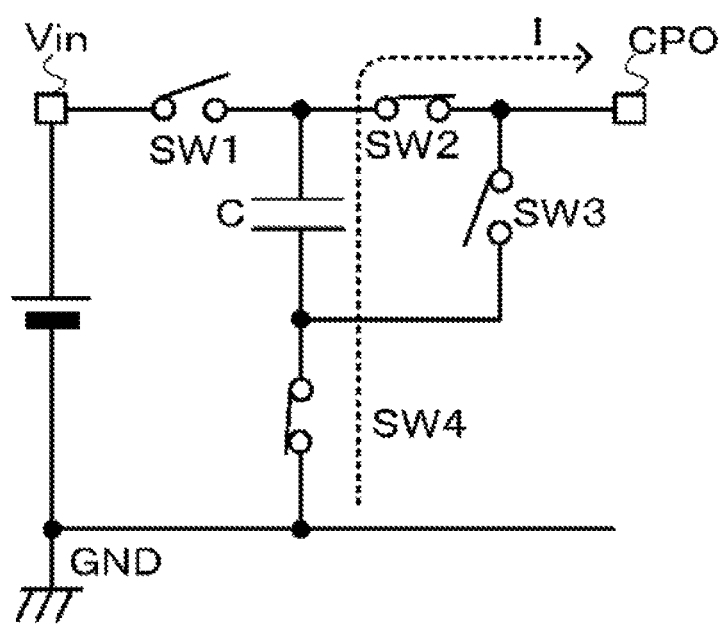

Finally, at time t14, the switch SW1 is turned off. Accordingly, as illustrated in FIG. 4E, the switches SW1 and SW3 are turned off and the switches SW2 and SW4 are turned on, that is, the circuit enters the second state. At this time, the current I flows from the ground terminal GND to the output terminal CPO via the switch SW4, the capacitor C, and the switch SW2.

Next, a transition order of the switches SW1 to SW4 in the second sequence SQ2 is described with reference to FIG. 5.

Figure 5A:
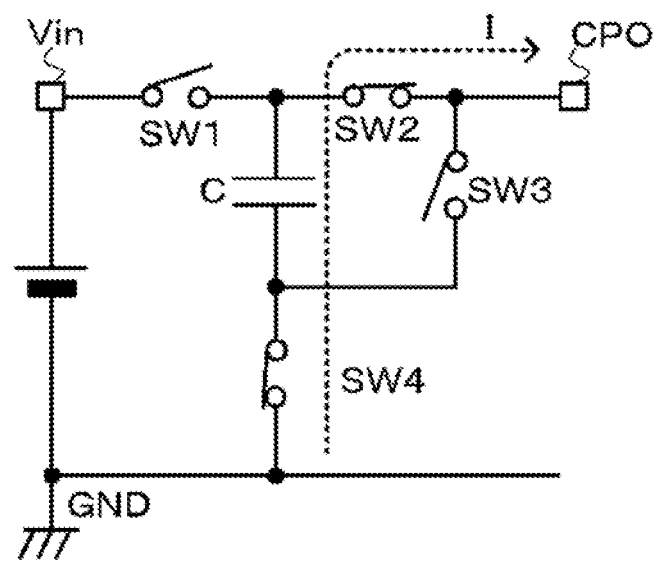
FIGS. 5A to 5E are diagrams illustrating a current path and a change in open and close states of switches in a sequence SQ2 illustrated in FIG. 3.
Figure 5B:
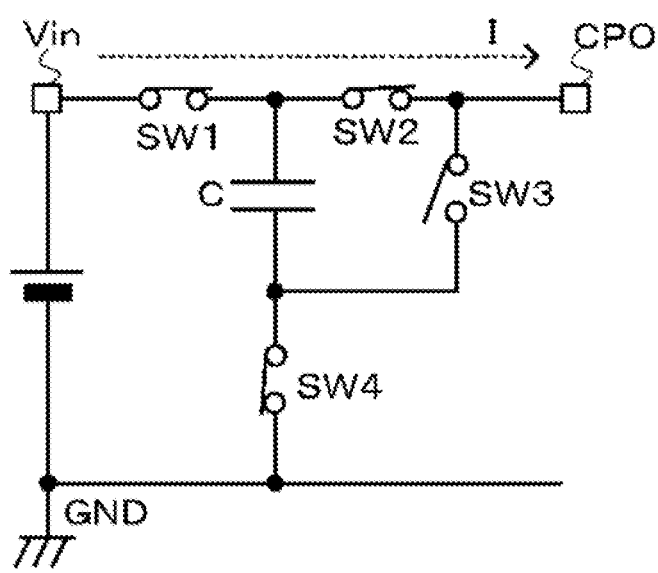

In transition of the second sequence SQ2 from the second state to the first state illustrated in FIG. 5A, the switch SW1 is first turned on at time t21 illustrated in FIG. 3. Accordingly, as illustrated in FIG. 5B, the switch SW1 is turned on in addition to the switches SW2 and SW4, and the switch SW3 is turned off. At this time, the current I flows from the power supply terminal PWT to the output terminal CPO via the switches SW1 and SW2.

Figure 5C:
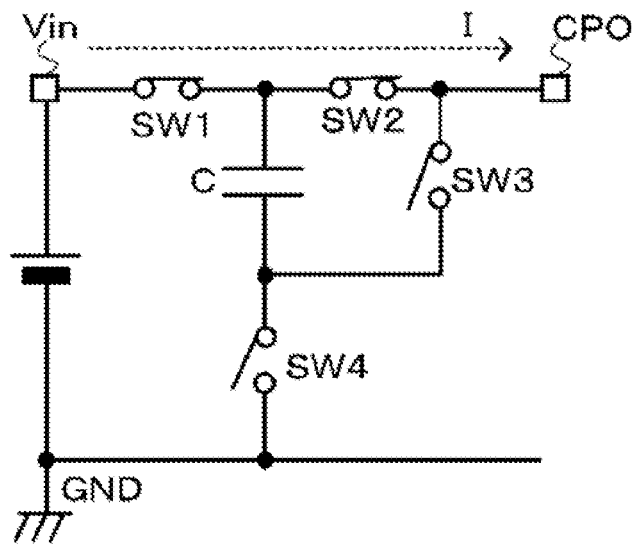

Next, at time t22, the switch SW4 is turned off. Accordingly, as illustrated in FIG. 5C, the switches SW1 and SW2 are turned on and the switches SW3 and SW4 are turned off. Even at this time, the current I flows from the power supply terminal PWT to the output terminal CPO via the switches SW1 and SW2.

Figure 5D:
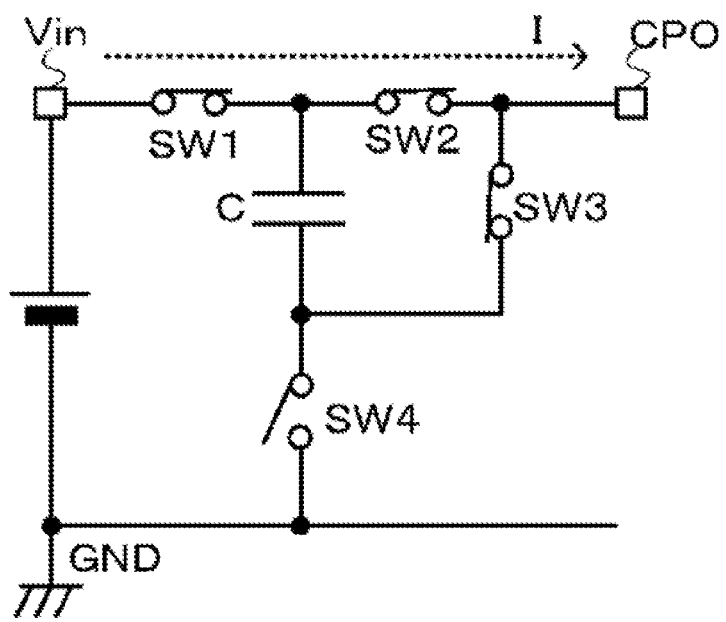

Next, at time t23, the switch SW3 is turned on. Accordingly, as illustrated in FIG. 5D, the switch SW3 is turned on in addition to the switches SW1 and SW2, and the switch SW4 is turned off. Even at this time, the current I flows from the power supply terminal PWT to the output terminal CPO via the switches SW1 and SW2.

Figure 5E:
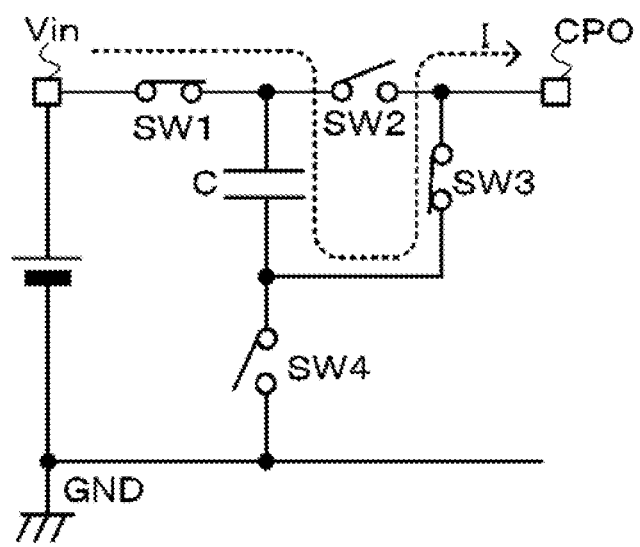

Finally, at time t24, the switch SW2 is turned off. Accordingly, as illustrated in FIG. 5E, the switches SW1 and SW3 are turned on and the switches SW2 and SW4 are turned off, that is, the circuit enters the first state. At this time, the current I flows from the power supply terminal PWT to the output terminal CPO via the switch SW1, the capacitor C, and the switch SW3.

In this way, according to this embodiment, by implementation of the sequences SQ1 and SQ2 at the time of switching between the first and second states, the output terminal CPO and the ground terminal GND are not short-circuited and a current is continuously supplied to the output terminal.

Figure 6:
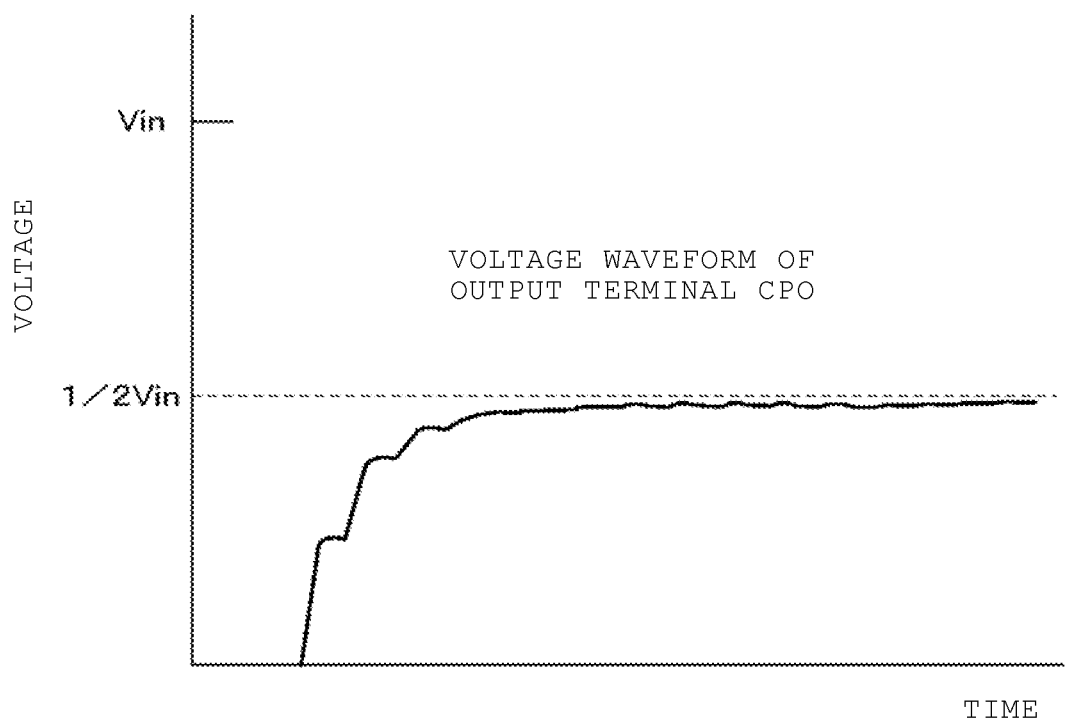
FIG. 6 is a diagram illustrating a state of a change in an output voltage of the charge pump circuit according to the first embodiment.

FIG. 6 illustrates an example of a voltage waveform of the output terminal CPO when the above-described switching sequences are implemented.

The voltage output to the output terminal CPO gradually increases by repeatedly switching the first and second states, and thus equilibrium state is achieved at the ½ voltage (½ Vin) of the input voltage Vin. At this time, since the above-described sequences SQ1 and SQ2 are implemented, the output terminal CPO and the ground terminal GND are not short-circuited momentarily and the current is normally supplied to the output terminal CPO.

Therefore, according to this embodiment, it is possible to suppress an abrupt drop of the potential of the output terminal CPO.

Second Embodiment

In the charge pump circuit 1 according to the above-described first embodiment, for example, as illustrated in FIG. 4B, there is a time in which the power supply terminal PWT and the output terminal CPO are directly connected via the switches SW1 and SW2 during the switching sequences of the sequences SQ1 and SQ2. At this time, the current flowing from the power supply terminal PWT to the output terminal CPO increases and the potential of the output terminal CPO considerably increases, and thus a ripple may occur. In this embodiment, accordingly, an example of a charge pump circuit capable of further reducing the ripple in the output terminal CPO during the switching sequence in which the first and second states are switched is described.

Figure 7:
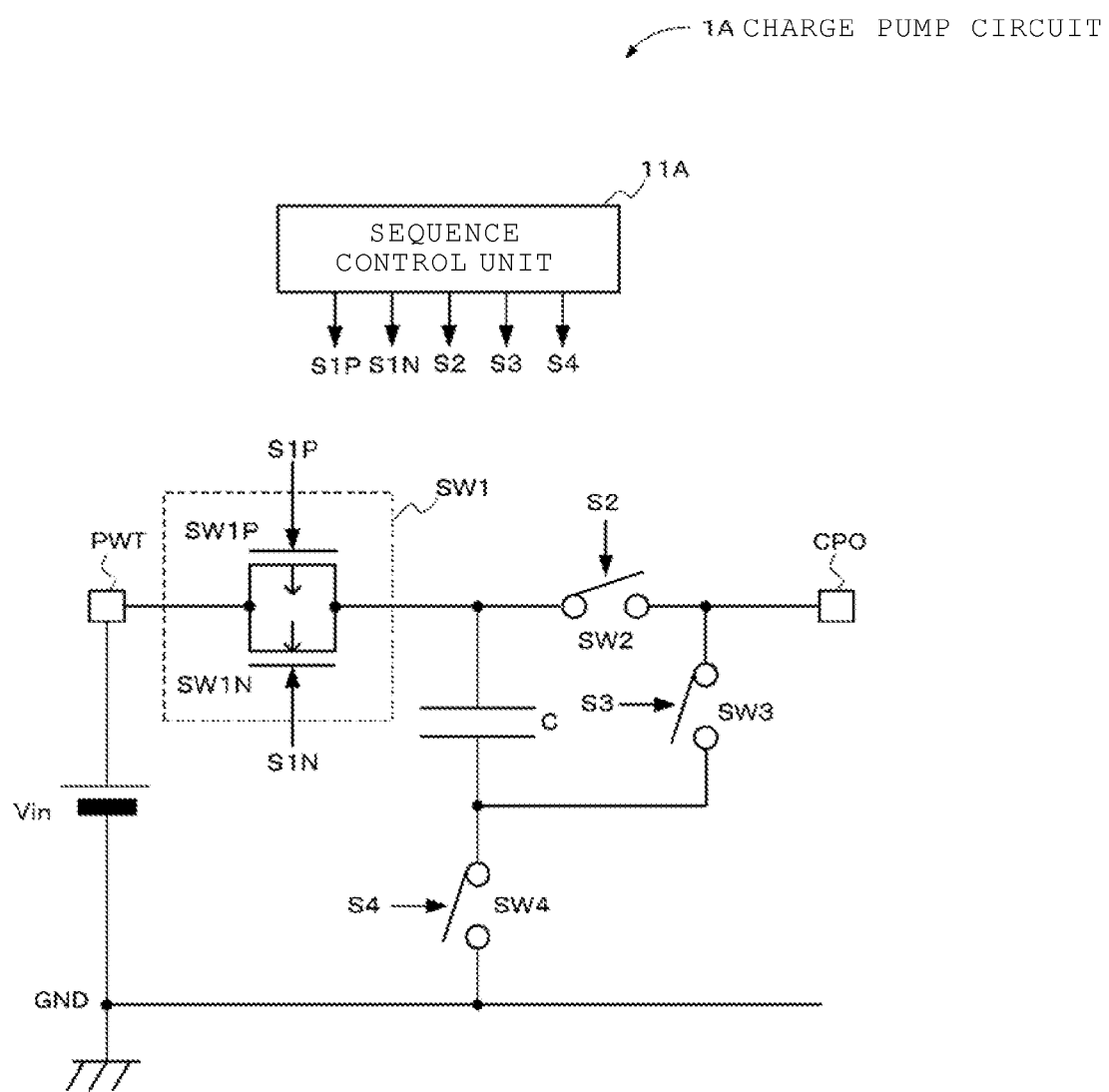
FIG. 7 is a circuit diagram illustrating an example of the configuration of a charge pump circuit according to a second embodiment.

FIG. 7 is a circuit diagram illustrating an example of the configuration of a charge pump circuit according to a second embodiment.

A charge pump circuit 1A according to this embodiment is different from the charge pump circuit 1 according to the first embodiment in that a switch SW1 is configured to include a P-type MOS transistor SW1P and an N-type MOS transistor SW1N connected in parallel, and a sequence control unit 11A switches the P-type MOS transistor SW1P and the N-type MOS transistor SW1N at different timings in accordance with switch control signals S1P and S1N.

Figure 8:
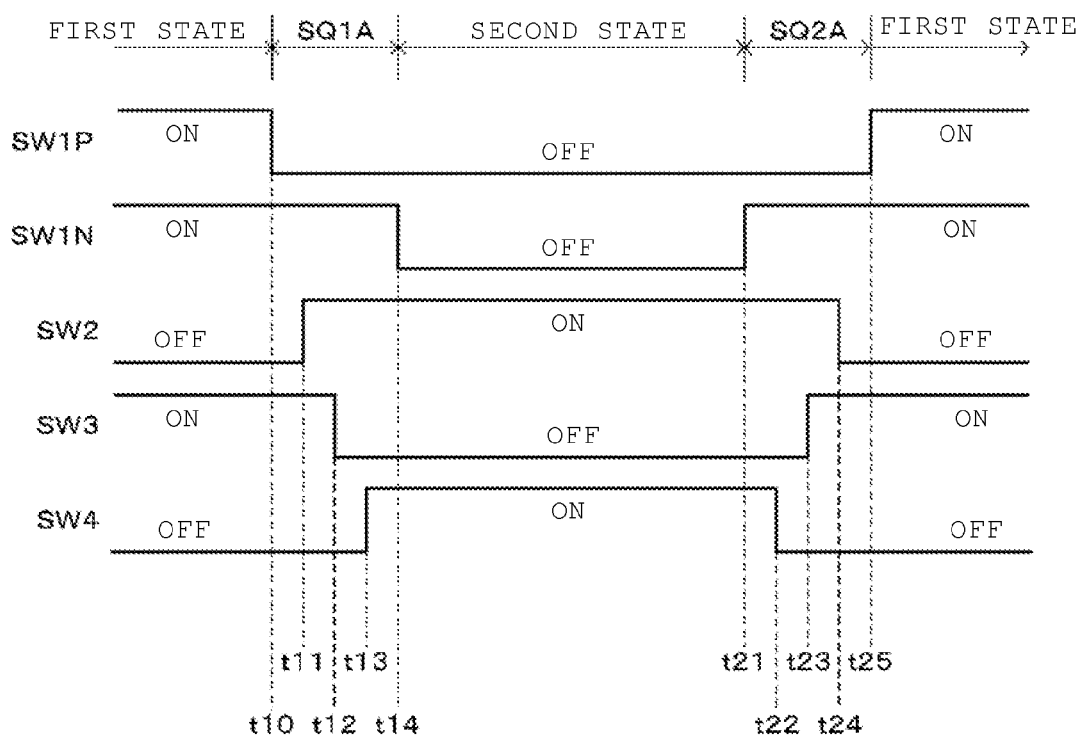
FIG. 8 is a timing chart illustrating an example of a switching sequence of the charge pump circuit according to the second embodiment.

FIG. 8 is a timing chart illustrating an example of a switching sequence.

In this embodiment, when the first sequence SQ1A from the first state to the second state occurs, the P-type MOS transistor SW1P is first turned off at time t10. In contrast, the N-type MOS transistor SW1N is turned off at time t14 as in the first embodiment. Under this switching control, only the N-type MOS transistor SW1N of the switch SW1 is in the ON state during a period from time t10 to time t14. Accordingly, during this period, the current flowing in the switch SW1 is less than when the P-type MOS transistor SW1P and the N-type MOS transistor SW1N are simultaneously turned on.

The switching control at time t11, time t12, and t13 are the same as that of the first embodiment, and thus the description thereof is omitted.

Conversely, when a second sequence SQ2A from the second state to the first state occurs, the N-type MOS transistor SW1N is first turned on at time t21, as in the first embodiment. In contrast, the P-type MOS transistor SW1P is turned on at time t25. Under this switching control, only the N-type MOS transistor SW1N of the switch SW1 is in the ON state during a period from time t21 to time t25. Accordingly, during this period, the current flowing in the switch SW1 is less than when the P-type MOS transistor SW1P and the N-type MOS transistor SW1N are simultaneously turned on.

The switching control at time t22, time t23, and t24 are the same as that of the first embodiment, and thus the description thereof is omitted.

According to this embodiment, when the switches SW1 an SW2 are simultaneously turned on at the time of implementation of the sequences SQ1A and SQ2A, only the N-type MOS transistor SW1N of the switch SW1 is turned on. Therefore, it is possible to reduce the current flowing from the power supply terminal PWT to the output terminal CPO via the switches SW1 and SW2. Accordingly, it is possible to suppress an increase in the potential of the output terminal CPO and it is possible to further suppress the ripple in the output terminal CPO.

Third Embodiment

Here, an example in which the charge pump circuit according to the first or second embodiment and an LDO series regulator are combined to configure a step-down regulator circuit is described.

Figure 9:
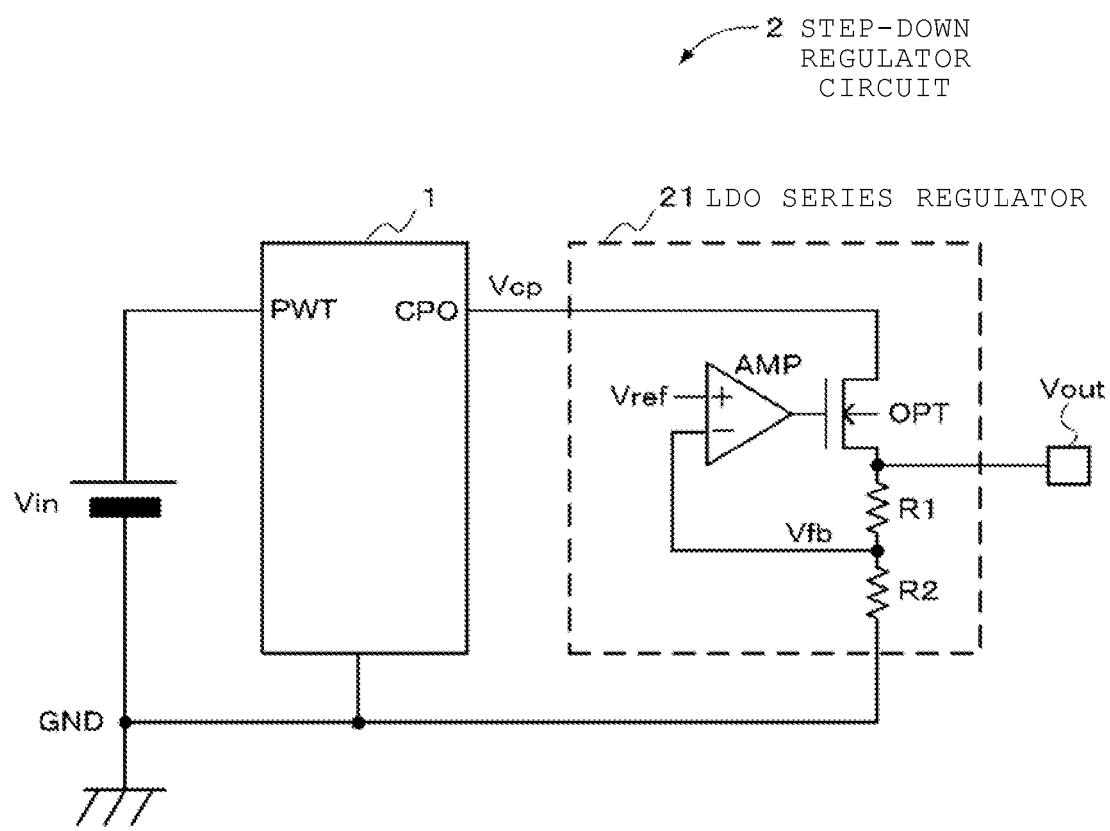
FIG. 9 is a circuit diagram illustrating an example of the configuration of a step-down regulator circuit according to a third embodiment.

FIG. 9 is a circuit diagram illustrating an example of the configuration of a step-down regulator circuit according to a third embodiment.

A step-down regulator circuit 2 according to this embodiment includes the charge pump circuit 1 according to the first embodiment and an LDO series regulator 21 in which an output transistor OPT is connected to the output terminal CPO of the charge pump circuit 1.

Instead of the charge pump circuit 1, the charge pump circuit 1A according to the second embodiment may be used.

In the charge pump circuit 1, the voltage Vin is input to the power supply terminal PWT and a voltage Vcp which is ½ Vin in an equilibrium state of a switching operation is output from the output terminal CPO.

The LDO series regulator 21 includes an NMOS output transistor OPT in which a source terminal is connected to the output terminal CPO of the charge pump circuit 1 and a drain terminal is connected to an output terminal Vout; and an amplifier AMP that amplifies an error between a reference voltage Vref and a feedback voltage Vfb obtained by dividing an output voltage Vout of the output terminal Vout by resistors R1 and R2 and controls a gate voltage of the output transistor OPT.

The amplifier AMP adjusts the gate voltage of the output transistor OPT so that the error between the feedback voltage Vfb and the reference voltage Vref approaches zero. Accordingly, the output voltage Vout is maintained at a substantially constant value.

In this embodiment, since the ripple of the voltage Vcp output from the charge pump circuit 1 is small at the time of the equilibrium state of the switching operation, occurrence of the ripple is reduced in the output voltage Vout of the LDO series regulator 21 to which the voltage Vcp is input.

In this embodiment, there is the advantage of reducing a loss occurring in the LDO series regulator 21 in addition to the advantage of reducing the occurrence of the ripple of the output voltage Vout.

Accordingly, next, the advantage of suppressing the loss occurring in the LDO series regulator 21 is described.

Figure 10:
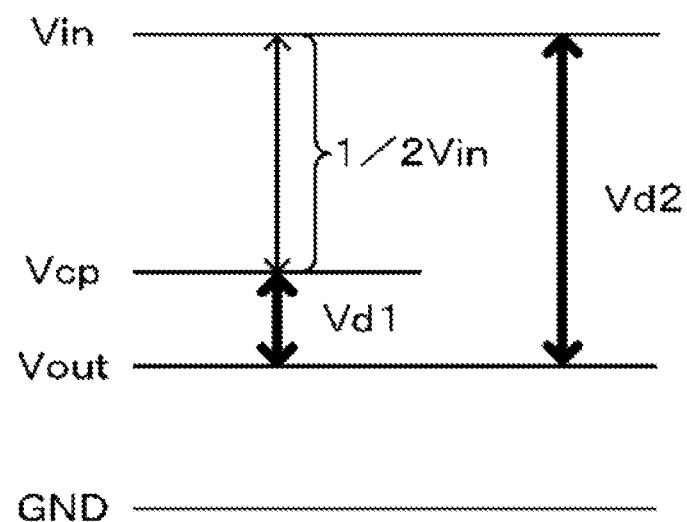
FIG. 10 is a diagram illustrating a relation among an input voltage of the step-down regulator circuit according to the third embodiment, and an output voltage of a charge pump circuit and an output voltage of an LDO series regulator.

FIG. 10 is a diagram illustrating a relation between potentials of the input voltage Vin of the charge pump circuit 1, and the output voltage Vcp and the output voltage Vout of the LDO series regulator 21.

The output voltage Vout of the LDO series regulator 21 is lower than the output voltage Vcp of the charge pump circuit 1. Accordingly, when Vd1 is a difference between the output voltage Vout and the output voltage Vcp, a loss corresponding to the difference Vd1 occurs in the LDO series regulator 21.

On the other hand, when the input voltage Vin is assumed be input directly to the LDO series regulator 21, a loss corresponding to a difference Vd2 between the output voltage Vout and the input voltage Vin occurs in the LDO series regulator 21.

According to this embodiment, it is possible to reduce a loss occurring the LDO series regulator 21 by an amount related to Vd2−Vd1 (=½ Vin) more than when the input voltage Vin is input directly to the LDO series regulator 21.

At this time, in the charge pump circuit 1, no loss occurs because the charges are merely stored and moved. In the entire step-down regulator circuit 2, therefore, the loss can be considerably reduced more than when only the LDO series regulator 212 is used.

According to this embodiment, it is possible to suppress the occurrence of the ripple of the output voltage Vout and it is possible to reduce the loss occurring in the LDO series regulator 21.

In the charge pump circuit according to at least one of the above-described embodiments, it is possible to suppress the abrupt drop of the output potential. Further, according to the step-down regulator circuit, it is possible to suppress the ripple of the output.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charge pump circuit comprising:
    a capacitor;
    a first switch that is connected between a first terminal of the capacitor and a power supply terminal;
    a second switch that is connected between the first terminal of the capacitor and an output terminal;
    a third switch that is connected between the output terminal and a second terminal of the capacitor;
    a fourth switch that is connected between the second terminal of the capacitor and a ground terminal; and
    a control unit configured to generate:
    control signals during a first period that cause the first and third switches to be in an ON state and the second and fourth switches to be in an OFF state,
    control signals during a second period following the first period that cause the first and third switches to be in an OFF state and the second and fourth switches to be in an ON state, and
    control signals during a first transition period between the first and second periods that cause the ON/OFF state of each of the first, second, third, and fourth switches to be switched at different times, such that, during the first transition period, the second switch is turned ON, then the third switch is turned OFF, then the fourth switch is turned ON, and then the first switch is turned OFF.

2. The charge pump circuit according to claim 1, wherein the control unit is further configured to generate:
    control signals during a third period following the second period that cause the first and third switches to be in the ON state and the second and fourth switches to be in the OFF state, and
    control signals during a second transition period between the second and third periods that cause the ON/OFF state of each of the first, second, third, and fourth switches to be switched at different times.

3. The charge pump circuit according to claim 2, wherein the control unit during the second transition period generates control signals to cause the first switch to be turned ON, then the fourth switch to be turned OFF, then the third switch to be turned ON, and then the second switch to be turned OFF.

4. The charge pump circuit according to claim 1, wherein a voltage on the output terminal is one-half of a voltage on the power supply terminal.

5. A charge pump circuit comprising:
a capacitor;
a first switch that is connected between a first terminal of the capacitor and a power supply terminal, the first switch including first and second switching elements;
a second switch that is connected between the first terminal of the capacitor and an output terminal;
a third switch that is connected between the output terminal and a second terminal of the capacitor;
a fourth switch that is connected between the second terminal of the capacitor and a ground terminal; and
a control unit configured to generate:
control signals during a first period that cause the first and third switches to be in an ON state and the second and fourth switches to be in an OFF state,
control signals during a second period following the first period that cause the first and third switches to be in an OFF state and the second and fourth switches to be in an ON state,
control signals during a third period following the second period that cause the first and third switches to be in the ON state and the second and fourth switches to be in the OFF state,
control signals during a first transition period between the first and second periods that cause the first and second switching elements to be in opposite ON/OFF states, and the first and second switching elements of the first switch to be switched at different times, and also the second, third, and fourth switches to be switched at different times, and
control signals during a second transition period between the second and third periods that cause the first and second switching elements to be in opposite ON/OFF states.

6. The charge pump circuit according to claim 5, wherein the control signals generated during the first transition period cause the first switching element to be turned OFF, then the second switch to be turned ON, then the third switch to be turned OFF, then the fourth switch to be turned ON, and then the second switching element to be turned OFF.

7. The charge pump circuit according to claim 6, wherein the control signals generated during the second transition period cause the first and second switching elements of the first switch to be switched at different times, and also the second, third, and fourth switches to be switched at different times.

8. The charge pump circuit according to claim 7, wherein the control signals generated during the second transition period cause the second switching element to be turned ON, then the fourth switch to be turned OFF, then the third switch to be turned ON, then the second switch to be turned OFF, and then the first switching element to be turned ON.

9. The charge pump circuit according to claim 5, wherein the control signals generated during the second transition period cause the first and second switching elements of the first switch to be switched at different times, and also the second, third, and fourth switches to be switched at different times.

10. The charge pump circuit according to claim 9, wherein the control signals generated during the second transition period cause the second switching element to be turned ON, then the fourth switch to be turned OFF, then the third switch to be turned ON, then the second switch to be turned OFF, and then the first switching element to be turned ON.

11. The charge pump circuit according to claim 5, wherein a voltage on the output terminal is ½ of a voltage on the power supply terminal.

12. A method for controlling a charge pump having a capacitor and first, second, third and fourth switches, the first switch being connected between a first terminal of the capacitor and a power supply terminal, the second switch being connected between the first terminal of the capacitor and an output terminal, the third switch being connected between the output terminal and a second terminal of the capacitor, and the fourth switch that is connected between the second terminal of the capacitor and a ground terminal, said method comprising:
generating control signals during a first period causing the first and third switches to be in an ON state and the second and fourth switches to be in an OFF state,
generating control signals during a second period following the first period causing the first and third switches to be in an OFF state and the second and fourth switches to be in an ON state, and
generating control signals during a first transition period between the first and second periods causing the ON/OFF state of each of the first, second, third, and fourth switches to be switched at different times.

13. The method according to claim 12, wherein the control signals generated during the first transition period cause the second switch to be turned ON, then the third switch to be turned OFF, then the fourth switch to be turned ON, and then the first switch to be turned OFF.

14. The method according to claim 13, further comprising:
generating control signals during a third period following the second period causing the first and third switches to be in the ON state and the second and fourth switches to be in the OFF state; and
generating control signals during a second transition period between the second and third periods causing the ON/OFF state of the first, second, third, and fourth switches to be switched at different times.

15. The method according to claim 14, wherein the control signals generated during the second transition period cause the first switch to be turned ON, then the fourth switch to be turned OFF, then the third switch to be turned ON, and then the second switch to be turned OFF.

16. The method according to claim 12, further comprising:
generating control signals during a third period following the second period, causing the first and third switches to be in the ON state and the second and fourth switches to be in the OFF state; and
generating control signals during a second transition period between the second and third periods causing the ON/OFF state of each of the first, second, third, and fourth switches to be switched at different times.

17. The method according to claim 12, wherein a voltage on the output terminal is one-half of a voltage on the power supply terminal.

* * * * *